US011663738B2

(12) United States Patent
Zhou

(10) Patent No.: US 11,663,738 B2
(45) Date of Patent: May 30, 2023

(54) AR DATA SIMULATION WITH GAITPRINT IMITATION

(71) Applicant: Snap Inc., Santa Monica, CA (US)

(72) Inventor: Kai Zhou, Wr Neudorf (AT)

(73) Assignee: SNAP INC., Santa Monica, CA (US)

( * ) Notice: Subject to any disclaimer, the term of this patent is extended or adjusted under 35 U.S.C. 154(b) by 16 days.

(21) Appl. No.: 17/518,817

(22) Filed: Nov. 4, 2021

(65) Prior Publication Data

US 2022/0375121 A1 Nov. 24, 2022

Related U.S. Application Data

(60) Provisional application No. 63/190,113, filed on May 18, 2021.

(51) Int. Cl.
*G06V 40/20* (2022.01)
*G06T 7/73* (2017.01)
*G06T 11/60* (2006.01)
*G06V 20/20* (2022.01)

(52) U.S. Cl.
CPC ............... *G06T 7/74* (2017.01); *G06T 11/60* (2013.01); *G06V 20/20* (2022.01); *G06V 40/25* (2022.01); *G06T 2207/30241* (2013.01); *G06T 2207/30244* (2013.01)

(58) Field of Classification Search
None
See application file for complete search history.

(56) References Cited

U.S. PATENT DOCUMENTS

2020/0315449 A1\* 10/2020 Kayser ............... G06F 1/1637
2020/0324196 A1\* 10/2020 Nakamura ............ A63F 13/216

FOREIGN PATENT DOCUMENTS

WO 2022245653 11/2022

OTHER PUBLICATIONS

"International Application Serial No. PCT/US2022/029197, International Search Report dated Aug. 31, 2022", 4 pgs.
"International Application Serial No. PCT/US2022/029197, Written Opinion dated Aug. 31, 2022", 9 pgs.
Ortega-Palacios, R, "Gait Analysis System by Augmented Reality", IEEE 2015 Pan American Health Care Exchanges (PAHCE), (Mar. 2015), 4 pgs.

(Continued)

*Primary Examiner* — Steven Z Elbinger
(74) *Attorney, Agent, or Firm* — Schwegman Lundberg & Woessner, P.A.

(57) ABSTRACT

A method for transferring a gait pattern of a first user to a second user to simulate augmented reality content in a virtual simulation environment is described. In one aspect, the method includes identifying a gait pattern of a first user operating a first visual tracking system in a first physical environment, identifying a trajectory from a second visual tracking system operated by a second user in a second physical environment, the trajectory based on poses of the second visual tracking system over time, modifying the trajectory from the second visual tracking system based on the gait pattern of the first user, applying the modified trajectory in a plurality of virtual environments, and generating simulated ground truth data based on the modified trajectory in the plurality of virtual environments.

20 Claims, 9 Drawing Sheets

(56) References Cited

OTHER PUBLICATIONS

Pfeuffer, Ken, "Behavioural Biometrics in VR: Identifying People from Body Motion and Relations in Virtual Reality", CHI 2019, Glasgow, Scotland UK, (May 2019), 12 pgs.

Shen, Yiran, "GaitLock: Protect Virtual and Augmented Reality Headsets Using Gait", IEEE Transactions on Dependable and Secure Computing, 16(3), (May Jun. 2019), 484-497.

Sivasamy, Manimaran, "VRCAuth: Continuous Authentication of Users; in Virtual Reality Environment Using Head-Movement", Proceedings of the Fifth International Conference on Communication and Electronics Systems (ICCES 2020), Coimbatore, India, (2020), 518-523.

* cited by examiner

AR DATA SIMULATION WITH GAITPRINT IMITATION

RELATED APPLICATION

The present application claims priority to U.S. Provisional Patent Application Ser. No. 63/190,113, filed May 18, 2021, which is hereby incorporated by reference in its entirety.

TECHNICAL FIELD

The subject matter disclosed herein generally relates to a visual tracking system. Specifically, the present disclosure addresses systems and methods for generating a motion database of visual tracking systems based on gaitprint.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
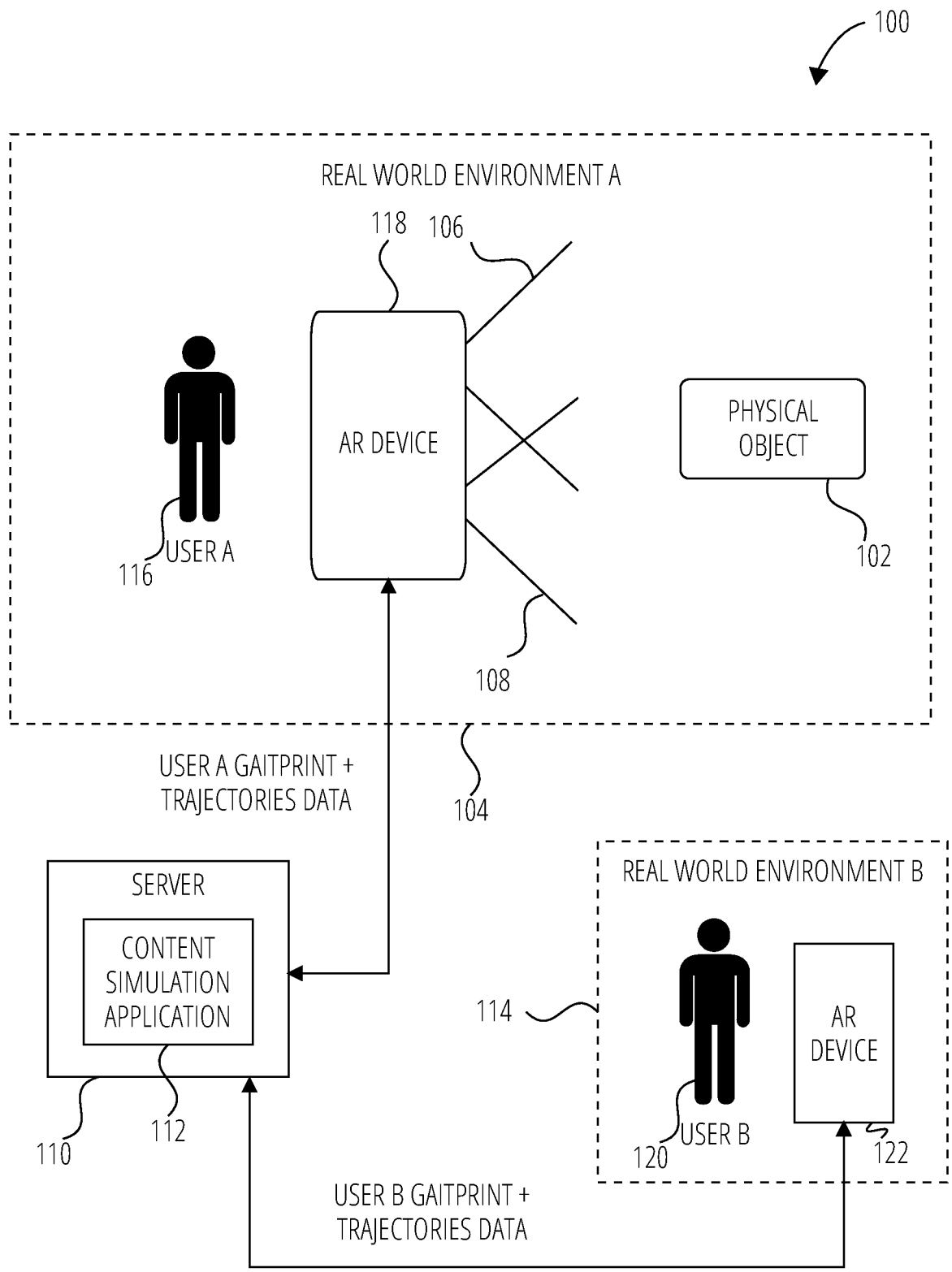
FIG. 1 is a block diagram illustrating an environment for operating a visual tracking system in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appear to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The "visual tracking system" is used herein to refer to a computer-operated application or system that enables a system to track visual features identified in images captured by one or more cameras of the visual tracking system, and build a model of a real-world environment based on the tracked visual features. Non-limiting examples of the visual tracking system include: a visual Simultaneous Localization and Mapping system (VSLAM), and Visual Odometry Inertial (VIO) system. VSLAM can be used to build a target from an environment or a scene based on one or more cameras of the visual tracking system. VIO (also referred to as a visual-inertial tracking system, and visual odometry system) determines a latest position or pose of a device based on data acquired from multiple sensors (e.g., depth cameras, inertial sensors) of the device.

The term "gait" (also referred to as "gait print") is herein to refer to a movement pattern of a user. For example, the gait identifies a biometric modality that identifies a user based on the way the user walk, runs, or jumps among some examples of movements.

AR/VR applications enable a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to a physical object of interest. In order to do this, the AR display device detects the physical object and tracks a pose of the AR display device relative to a position of the physical object. A pose identifies a position and orientation of the display device relative to a frame of reference or relative to another object. For VR, the virtual object appears at a location (in the virtual environment) based on the pose of the VR display device. The virtual content is therefore refreshed based on a latest position of the device.

The present application describes a method for transferring one human gait to another to simulate AR content in the virtual simulation world. This "impersonation" or transfer of one human gait to another user's trajectory generates large numbers of training/testing data that are based on one person's unique gait print. This training data can help personalize and further customize tuning of computer vision algorithms of visual tracking systems. As such, gait pattern for simulation of virtual environments enlarges the diversity of simulation trajectories (e.g., pose over time).

In one example embodiment, the present application describes a method for transferring a gait pattern of a first user to a second user to simulate augmented reality content in a virtual simulation environment. In one aspect, the method includes identifying a gait pattern of a first user operating a first visual tracking system in a first physical environment, identifying a trajectory from a second visual tracking system operated by a second user in a second physical environment, the trajectory based on poses of the second visual tracking system over time, modifying the trajectory from the second visual tracking system based on the gait pattern of the first user, applying the modified trajectory in a plurality of virtual environments, and generating simulated ground truth data based on the modified trajectory in the plurality of virtual environments.

As a result, one or more of the methodologies described herein facilitate solving the technical problem of calibrating camera intrinsic parameters based on operating conditions that are different from factory conditions. The presently described method provides an improvement to an operation of the functioning of a computer by providing further accurate calibration computation to enhance a VSLAM pose estimation. Furthermore, one or more of the methodologies described herein may obviate a need for certain efforts or computing resources. Examples of such computing resources include Processor cycles, network traffic, memory usage, data storage capacity, power consumption, network bandwidth, and cooling capacity.

FIG. 1 is a network diagram illustrating an environment 100 suitable for operating an AR device 118, an AR device 122, and a server 110, according to some example embodiments. The environment 100 includes a user B 120, an AR device 118, and a physical object 102. The user A 116 operates the AR device 118 in real world environment A 104. The user A 116 may be a human user (e.g., a human being), a machine user (e.g., a computer configured by a software program to interact with the user A 116), or any suitable combination thereof (e.g., a human assisted by a machine or a machine supervised by a human). The user A 116 is associated with the AR device 118. The user B 120 operates the user B 120 in real world environment B 114. The user B 120 is associated with the AR device 122.

The AR device 118 includes a computing device having a display such as a smartphone, a tablet computer, or a wearable computing device (e.g., watch or glasses). The computing device may be hand-held or may be removable mounted to a head of the user B 120. In one example, the display includes a screen that displays images captured with the cameras of the AR device 118. In another example, the display of the device may be transparent such as in lenses of wearable computing glasses. In other examples, the display may be non-transparent, partially transparent, or partially opaque. In yet other examples, the display may be wearable by the user A 116 to completely or partially cover the field of vision of the user A 116.

The AR device 118 includes an AR application (not shown) that causes a display of virtual content based on images detected with the cameras of the AR device 118. For example, the user B 120 may point multiple cameras of the AR device 118 to capture an image of the physical object 102. The physical object 102 is within a field of view 106 of a first camera (not shown) of the AR device 118 and within a field of view 108 of a second camera (not shown) of the AR device 118. The AR application generates virtual content corresponding to an identified object (e.g., physical object 102) in the image and presents the virtual content in a display (not shown) of the AR device 118.

The AR device 118 includes a visual tracking system (not shown) that tracks the pose (e.g., 6DOF pose, position and orientation) of the AR device 118 relative to the real world environment A 104 using, for example, optical sensors (e.g., depth-enabled 3D camera, image camera), inertia sensors (e.g., gyroscope, accelerometer), magnetometer, wireless sensors (Bluetooth, Wi-Fi), GPS sensor, and audio sensor. In one example, the AR device 118 includes a visual Simultaneous Localization and Mapping system (VSLAM) that operates with multiple cameras of the AR device 118. The AR device 118 displays virtual content based on the 3DFO pose of the AR device 118 relative to the real world environment A 104 and/or the physical object 102 (as determined by the visual tracking system).

In one example, the AR device 118 determines a gait print based on a motion of the user A 116. The AR device 118 sends the user A 116 gait print and the trajectory data (e.g., 6DOF over time) of the AR device 118 in the real world environment A 104 to a content simulation application 112 of the server 110 for further simulation and training of computer vision algorithms. The AR device 122 determines a gait print based on a motion of the user B 120. The AR device 122 sends the user B 120 gait print and the trajectory data (e.g., 6DOF over time) of the AR device 122 in the real world environment B 114 to the content simulation application 112 for further simulation and training of computer vision algorithms. The content simulation application 112 is described further below with respect to FIG. 5.

In another example, the content simulation application 112 receives sensor data from the AR device 118 and the AR device 122. The content simulation application 112 determines the gait print of the user A 116 and the user B 120 based on the second data.

In one example, the AR device 118 and the AR device 122 communicate with server 110 via a computer network (not shown). The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
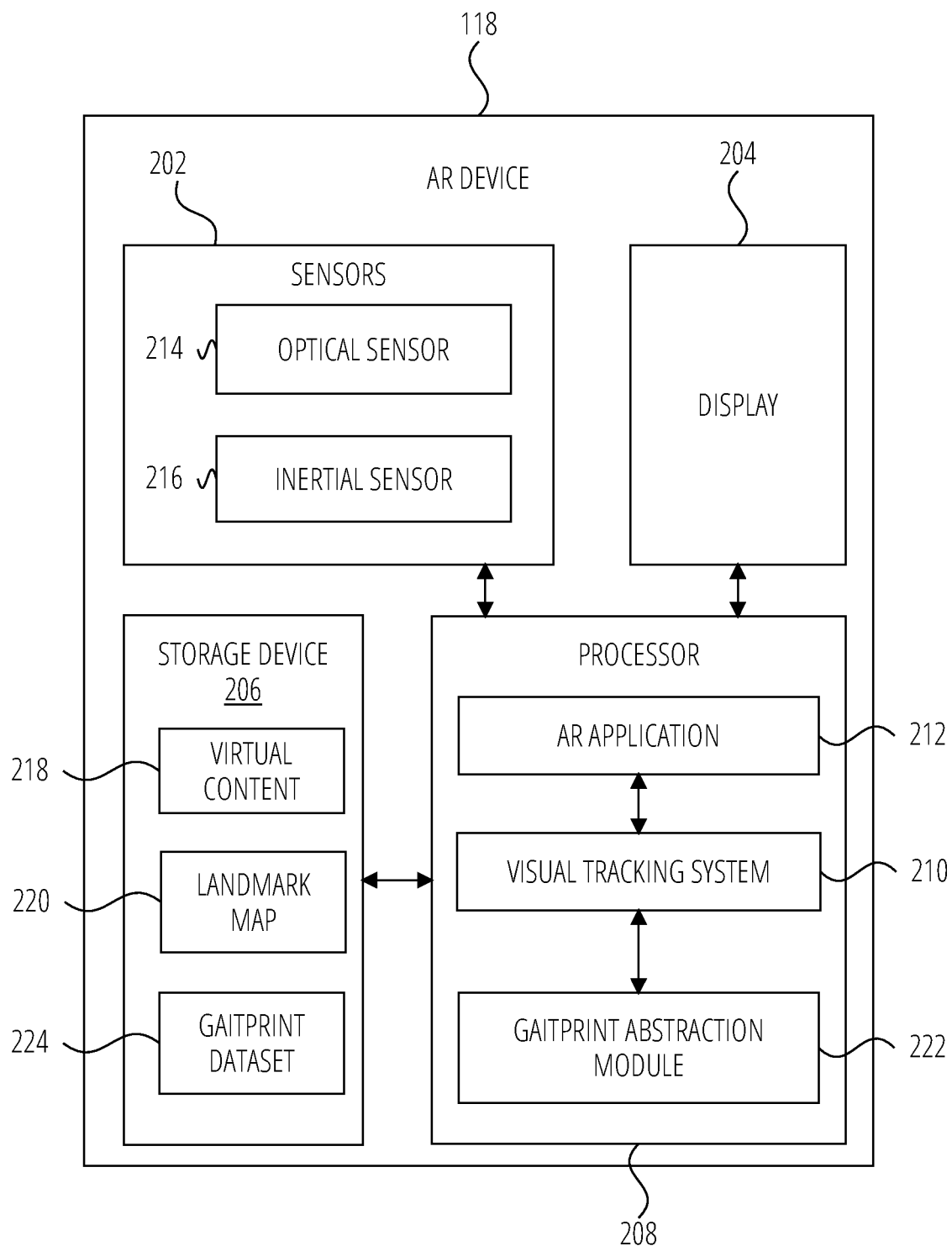
FIG. 2 is a block diagram illustrating a display device in accordance with one example embodiment.

FIG. 2 is a block diagram illustrating modules (e.g., components) of the AR device 118, according to some example embodiments. The AR device 118 includes sensors 202, a display 204, a processor 208, and a storage device 206. Examples of AR device 118 include a wearable computing device, a mobile computing device (such as a smart phone or smart table), a navigational device, a portable media device.

The sensors 202 include, for example, optical sensor 214 (e.g., camera such as a color camera, a thermal camera, a depth sensor and one or multiple grayscale, global shutter tracking cameras), an inertial sensor 216 (e.g., gyroscope, accelerometer, magnetometer). In one example, the optical sensor 214 include one or more cameras.

Other examples of sensors 202 include a proximity or location sensor (e.g., near field communication, GPS, Bluetooth, Wifi), an audio sensor (e.g., a microphone), a temperature sensor, or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user B 120 can see through the display 204 (in AR use case). In another example, the display 204 includes a touchscreen display configured to receive a user input via a contact on the touchscreen display.

The processor 208 includes an AR application 212, a visual tracking system 210, and a gaitprint abstraction module 222. The AR application 212 detects the physical object 102 using computer vision based on the detected features of the environment processed by the visual tracking system 210. The AR application 212 retrieves virtual content (e.g., 3D object model) based on the identified physical object 102 or physical environment. The AR application 212 renders the virtual object in the display 204. In one example embodiment, the AR application 212 includes a local rendering engine that generates a visualization of virtual content overlaid (e.g., superimposed upon, or otherwise displayed in tandem with) on an image of the physical object 102 captured by the optical sensor 214. A visualization of the virtual content may be manipulated by adjusting a position of the physical object 102 (e.g., its physical location, orientation, or both) relative to the optical sensor 214. Similarly, the visualization of the virtual content may be manipulated by adjusting a pose of the AR device 118 relative to the physical object 102. For a VR application, the AR application 212 displays the virtual content in an immersive virtual world displayed in the display 204 at a location (in the display 204) determined based on a pose of the AR device 118.

The visual tracking system 210 estimates a 6DOF pose of the AR device 118 and generate trajectory data (e.g., 6DOF poses over time). For example, the visual tracking system 210 uses image data and corresponding inertial data from the optical sensor 214 and the inertial sensor 216 to track a location and pose of the AR device 118 relative to a frame of reference (e.g., detected features in the real world environment A 104). Example components of the visual tracking system 210 are described in more detail below with respect to FIG. 3.

The gaitprint abstraction module 222 uses the 6DOF poses over time and the IMU data from the inertial sensor 216 to identify a gait print that is unique to the user A 116.

The storage device 206 stores virtual content 218, landmark map 220, and gaitprint dataset 224. The virtual content 218 includes, for example, a database of visual references (e.g., images of physical objects) and corresponding experiences (e.g., two-dimensional or three-dimensional virtual object models). The landmark map 220 stores trajectories data and a map of an environment based on features detected by the visual tracking system 210. The gaitprint dataset 224 stores the biometric gait print pattern of the user A 116 (as determined by the gaitprint abstraction module 222).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
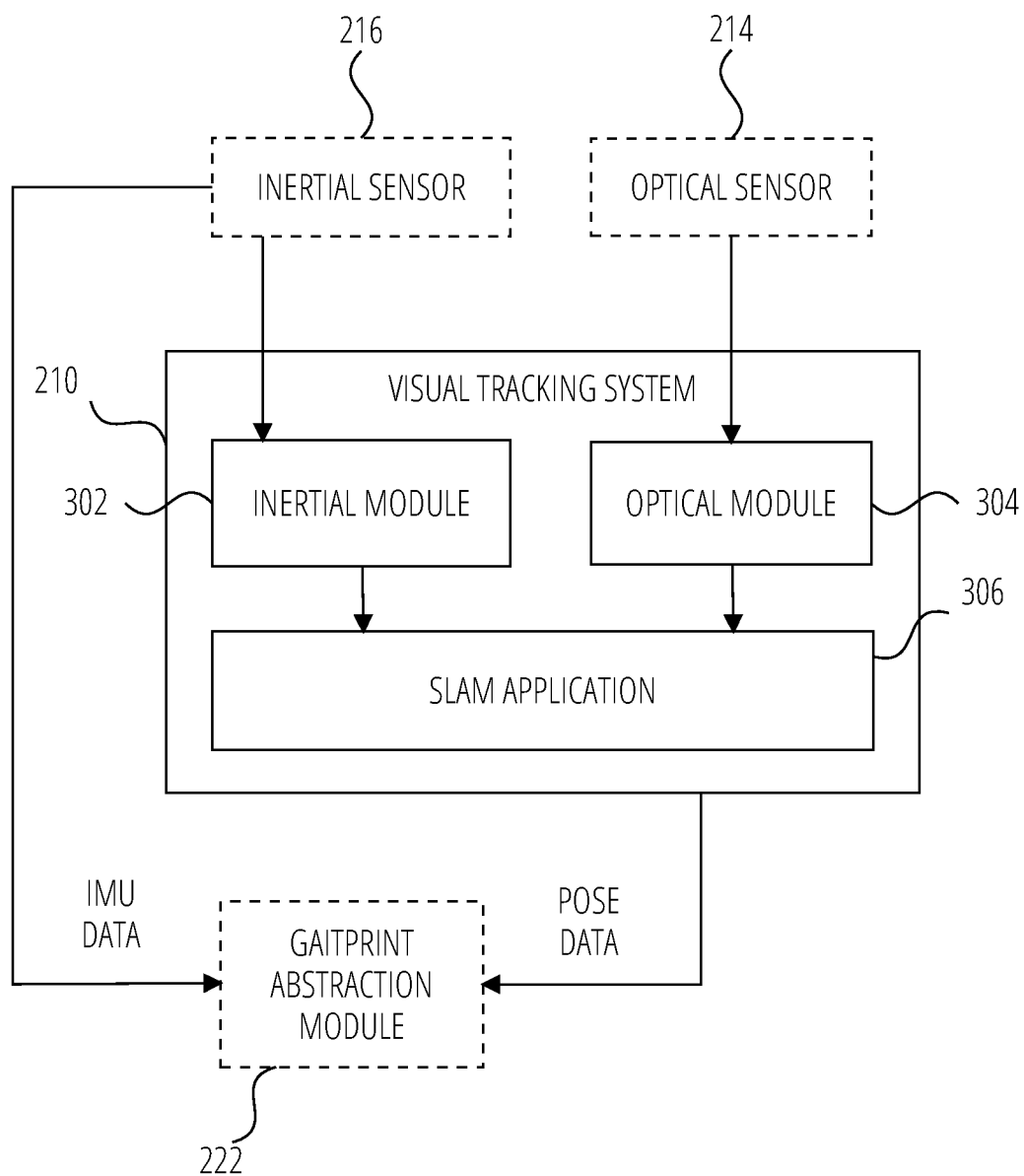
FIG. 3 is a block diagram illustrating a visual tracking system in accordance with one example embodiment.

FIG. 3 illustrates the visual tracking system 210 in accordance with one example embodiment. The visual tracking system 210 includes, for example, an inertial module 302, an optical module 304, a SLAM application 306. The inertial module 302 accesses inertial sensor data from the inertial sensor 216. The optical module 304 accesses optical sensor data from the optical sensor 214.

The SLAM application 306 determines a 3DOF pose (e.g., location, position, orientation) of the AR device 118 relative to a frame of reference (e.g., real world environment A 104). In one example embodiment, the SLAM application 306 includes a visual odometry system that estimates the pose of the AR device 118 based on 3D maps of feature points from images captured with the optical sensor 214 and the inertial sensor data captured with the inertial sensor 216. The SLAM application 306 is capable of operating as a stereo VSLAM and monocular VSLAM. In other words, the SLAM application 306 can toggle its operation between the monocular and stereo V-SLAM without the interruption of localization and mapping. The SLAM application 306 provides the pose information to the gaitprint abstraction module 222 so that the gaitprint abstraction module 222 can identify a gait print of the user A 116 based on the pose data and IMU data from the inertial sensor 216.

Figure 4:
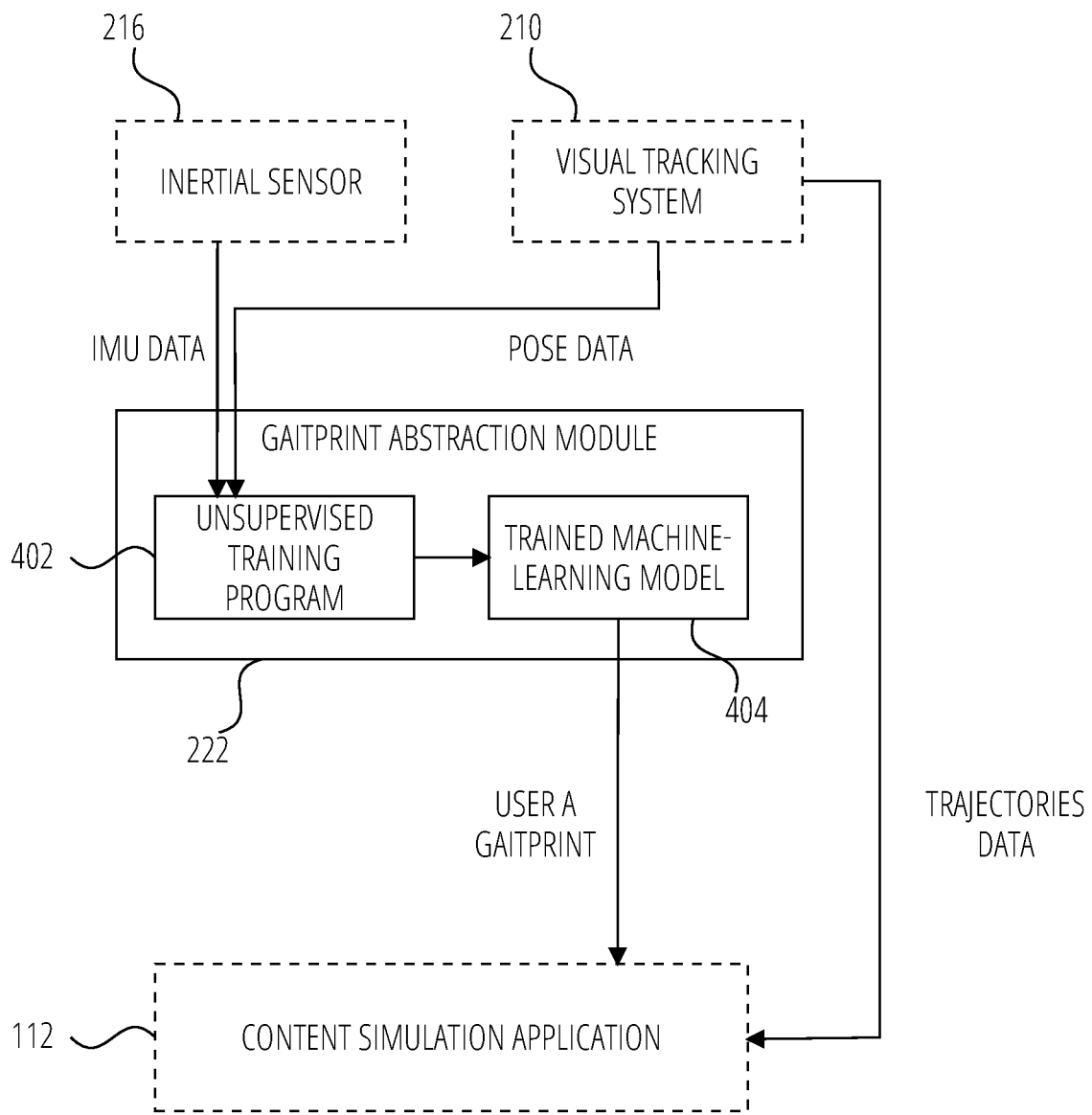
FIG. 4 is a block diagram illustrating a gait abstraction module in accordance with one example embodiment.

FIG. 4 is a block diagram illustrating a gaitprint abstraction module 222 in accordance with one example embodiment. The unsupervised training program 402 abstracts the movement of the AR device 118 (worn by the user A 116) to identify a gait pattern of the user A 116. The unsupervised training program 402 includes, for example, an unsupervised training program 402 and a trained machine-learning model 404.

The unsupervised training program 402 accesses inertial sensor data from the inertial sensor 216 and pose data from the visual tracking system 210. The unsupervised training program 402 operates an unsupervised training algorithm that learn patterns from untagged dataset (IMU data and pose data). The trained machine-learning model 404 trains a gait model based on the identified patterns from the unsupervised training program 402. The gait model identifies the user A 116 gait print. The trained machine-learning model 404 provides the user A 116 gait print to the content simulation application 112. In another example, the content simulation application 112 also receives the trajectories data from the visual tracking system 210.

Figure 5:
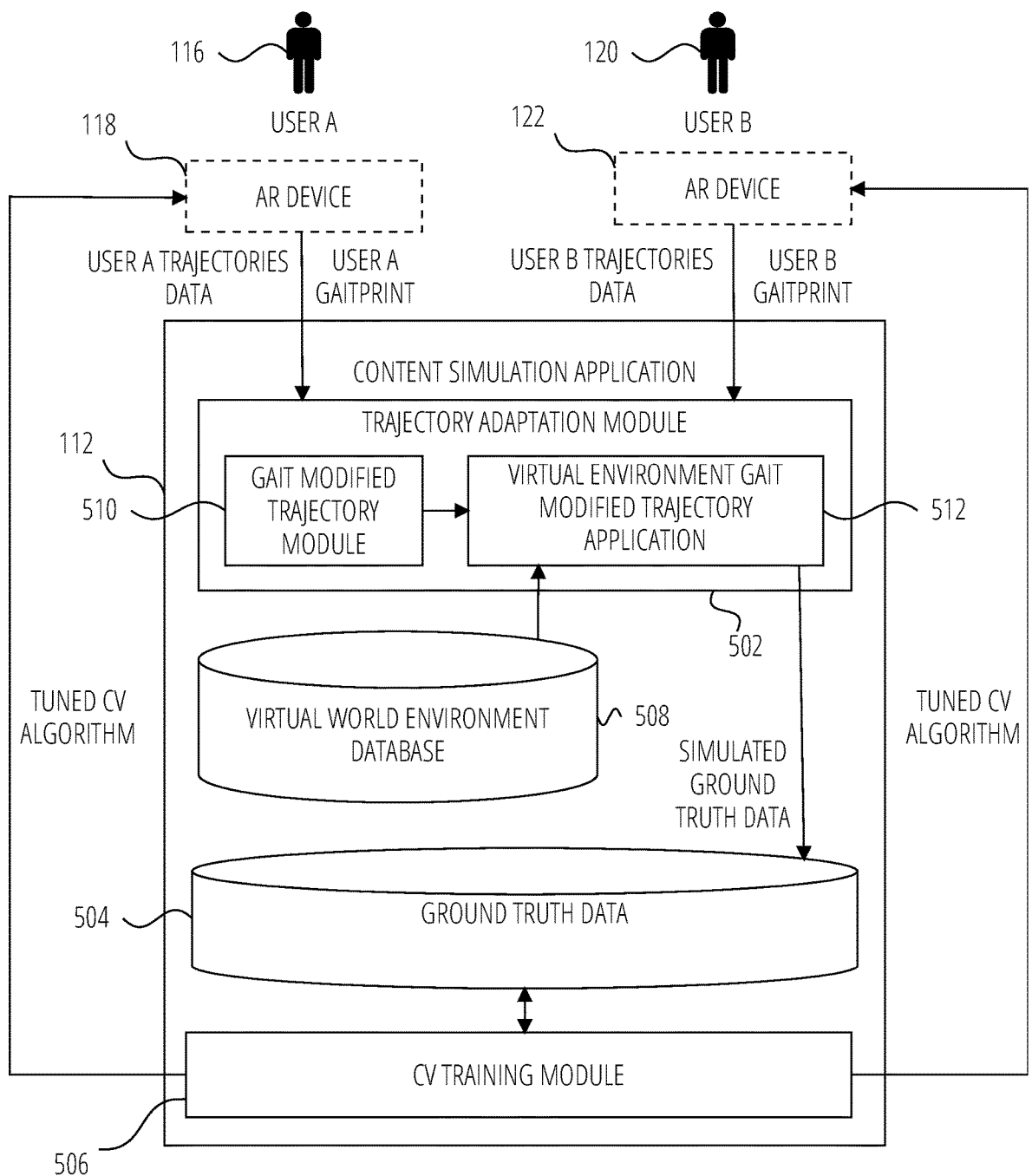
FIG. 5 is a block diagram illustrating a content simulation application in accordance with one example embodiment.

FIG. 5 is a block diagram illustrating the content simulation application 112 in accordance with one example embodiment. The content simulation application 112 includes a trajectory adaptation module 502, a virtual world environment database 508, a ground truth data 504, and a cv training module 506.

The trajectory adaptation module 502 adapts the gait print of a user to another user's trajectory in another physical environment. The trajectory adaptation module 502 receives the gait print of the user A 116 and trajectories data of the AR device 118. The trajectory adaptation module 502 also receives the gait print of the user B 120 and trajectories data of the AR device 122. In one example, the trajectory adaptation module 502 includes a gait modified trajectory module 510 and a virtual environment gait modified trajectory application 512.

The ground truth data 504 stores simulated ground truth data for SLAM and computer vision algorithm.

The cv training module 506 retrains a computer vision algorithm at the AR device 118/AR device 122.

Figure 6:
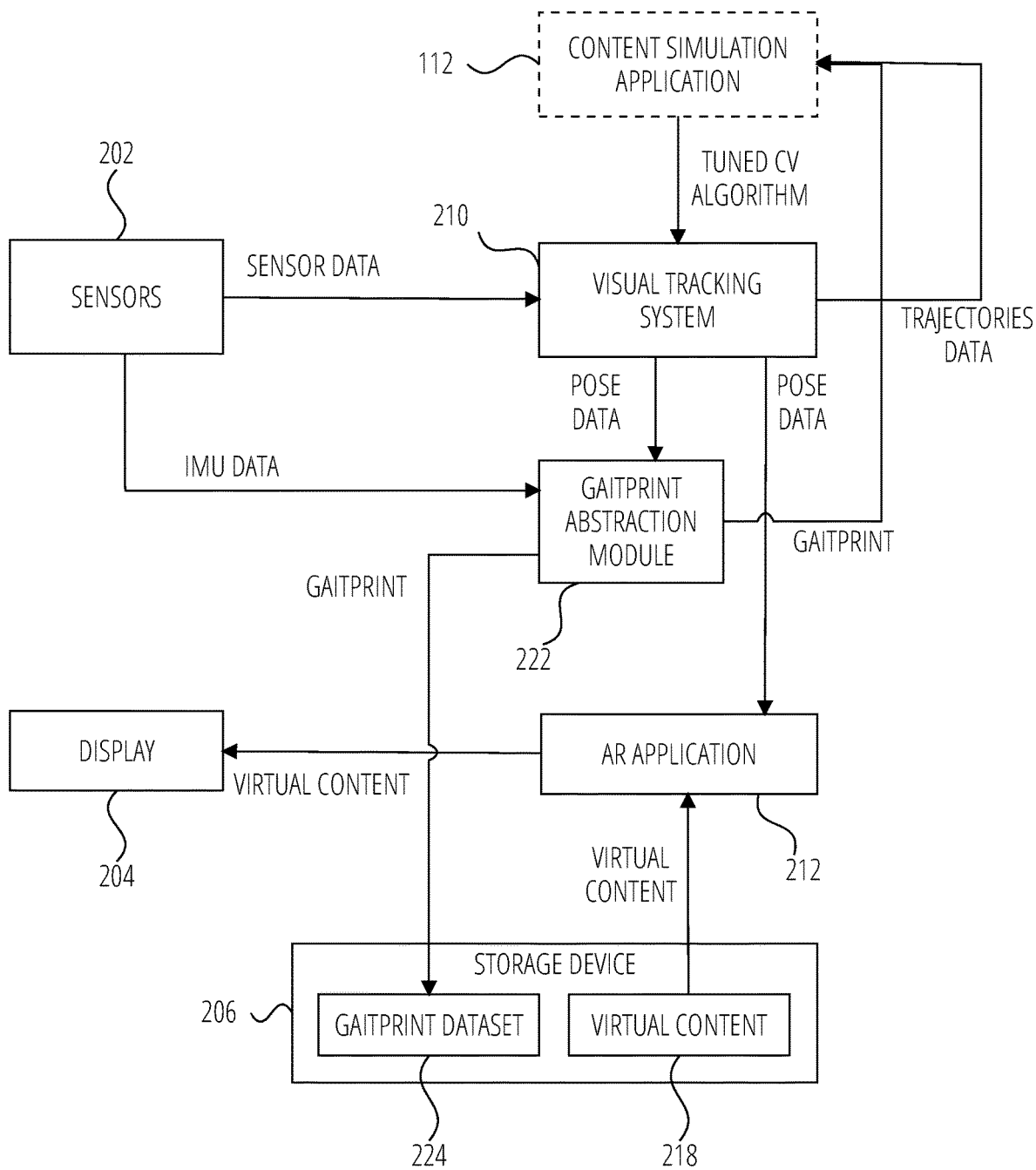
FIG. 6 is a block diagram illustrating a process in accordance with one example embodiment.

FIG. 6 is a block diagram illustrating an example process in accordance with one example embodiment. The sensors 202 provides sensor data to the visual tracking system 210 and the gaitprint abstraction module 222.

The visual tracking system 210 determines a 6DOF pose of the AR device 118 based on the sensor data. The visual tracking system 210 provides the pose data to the gaitprint abstraction module 222 and the AR application 212. The visual tracking system 210 provides trajectories data (e.g., 6DOF poses over time) to the content simulation application 112. In one example, the computer vision algorithm in the visual tracking system 210 is retuned or retrained based on the tuned computer vision algorithm received from the content simulation application 112.

The gaitprint abstraction module 222 identifies a gait print of the user A 116 based on the IMU data from sensors 202 and the pose data from visual tracking system 210. The gaitprint abstraction module 222 provides the gait print to the content simulation application 112 and to the storage device 206.

The AR application 212 retrieves virtual content from the virtual content 218. The AR application 212 instructs the display 204 to display the virtual content 218 at a location based on the geometric model (e.g., pose data) of the AR device 118.

The storage device 206 stores the gaitprint dataset 224 and the virtual content 218.

Figure 7:
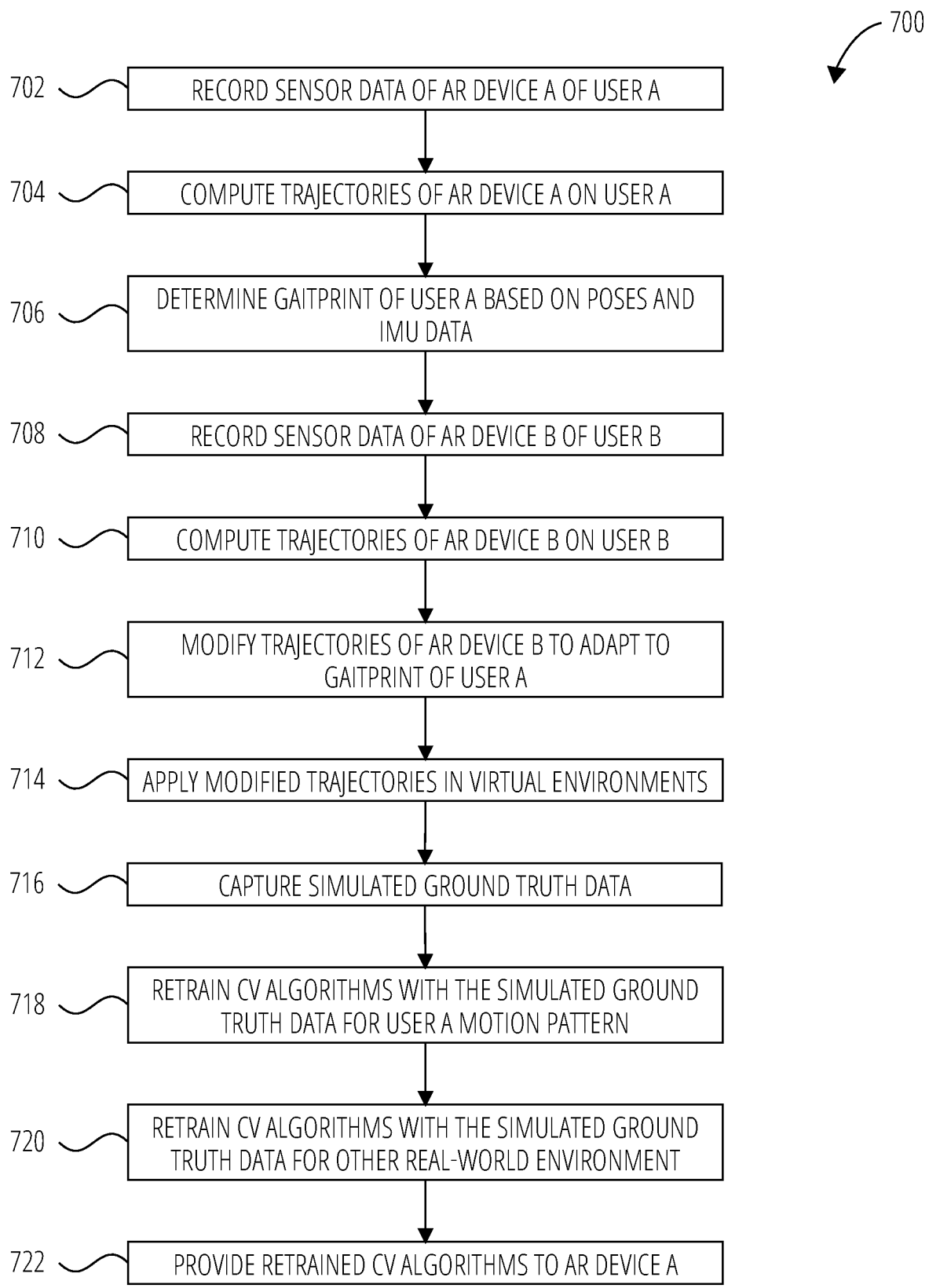
FIG. 7 is a flow diagram illustrating a method for generating ground truth data in accordance with one example embodiment.

FIG. 7 is a flow diagram illustrating a method 700 for generating ground truth data in accordance with one example embodiment. Operations in the method 700 may be performed by the server 110, using components (e.g., modules, engines) described above with respect to FIG. 5. Accordingly, the method 700 is described by way of example with reference to the server 110. However, it shall be appreciated that at least some of the operations of the method 700 may be deployed on various other hardware configurations or be performed by similar components residing elsewhere. For example, part of the method 700 may be operated at the AR device 118 or AR device 122.

In block 702, the server 110 records sensor data of AR device a of user A 116. In block 704, the server 110 computes trajectories of AR device a on user A 116. In block 706, the server 110 determines gait print of user a based on poses and imu data. In block 708, the server 110 record sensors data of AR device b of user b. In block 710, the server 110 computes trajectories of AR device b on user b. In block 712, the server 110 modifies trajectories of AR device b to adapt to gaitprint of user a. In block 714, the server 110 applies modified trajectories in virtual environments. In block 716, the server 110 captures simulated ground truth data. In block 718, the server 110 retrains CV algorithms with the simulated ground truth data for user a motion pattern. In block 720, the server 110 retrains CV algorithms with the simulated ground truth data for other real-world environment. In block 722, the server 110 provides retrained cv algorithms to AR device a.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 8:
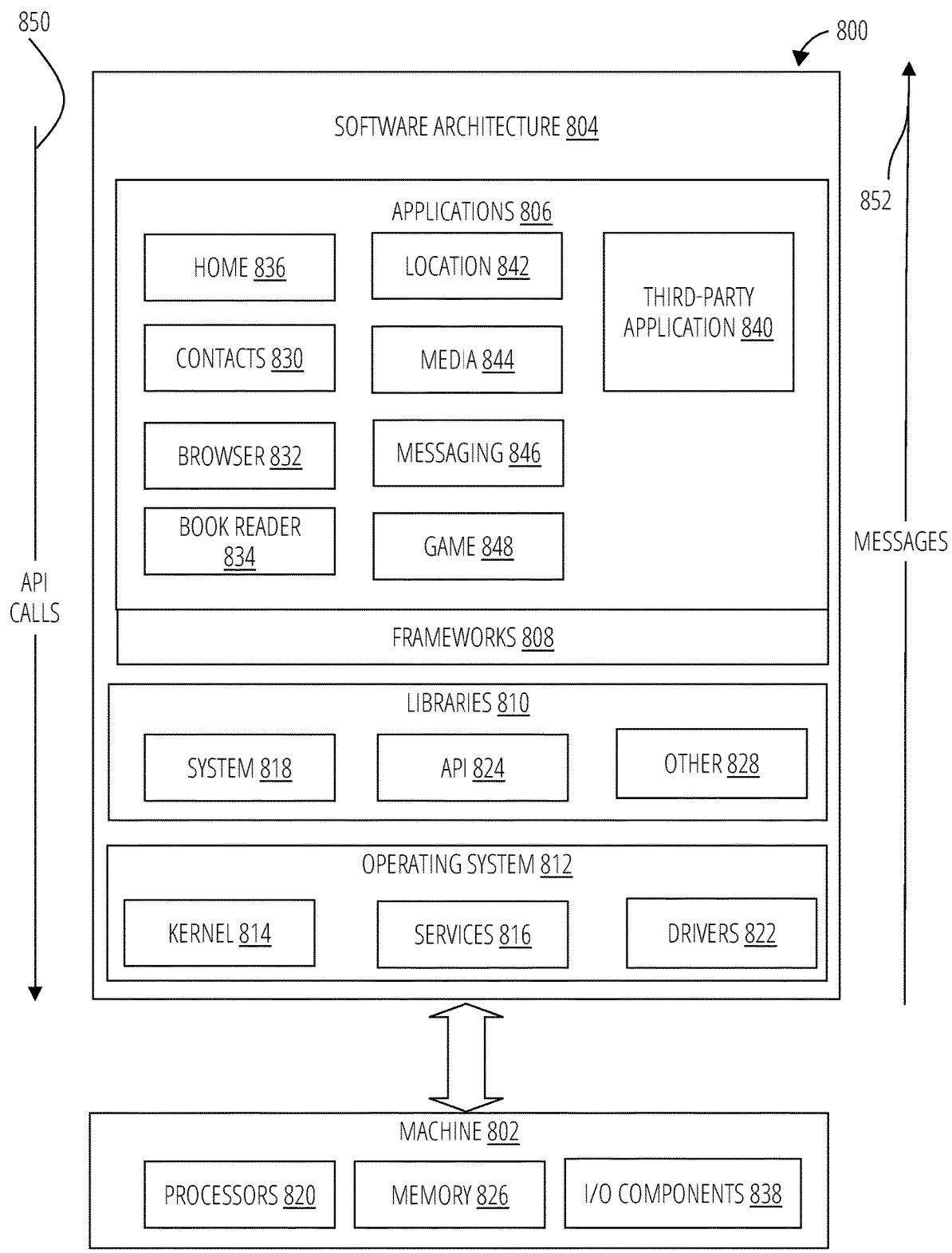
FIG. 8 is block diagram showing a software architecture within which the present disclosure may be implemented, according to an example embodiment.

FIG. 8 is block diagram 800 showing a software architecture within which the present disclosure may be implemented, according to an example embodiment. The software architecture 804 is supported by hardware such as a machine 802 that includes Processors 820, memory 826, and I/O Components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, Processor management (e.g., scheduling), Component management, networking, and security settings, among other functionalities. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Figure 9:
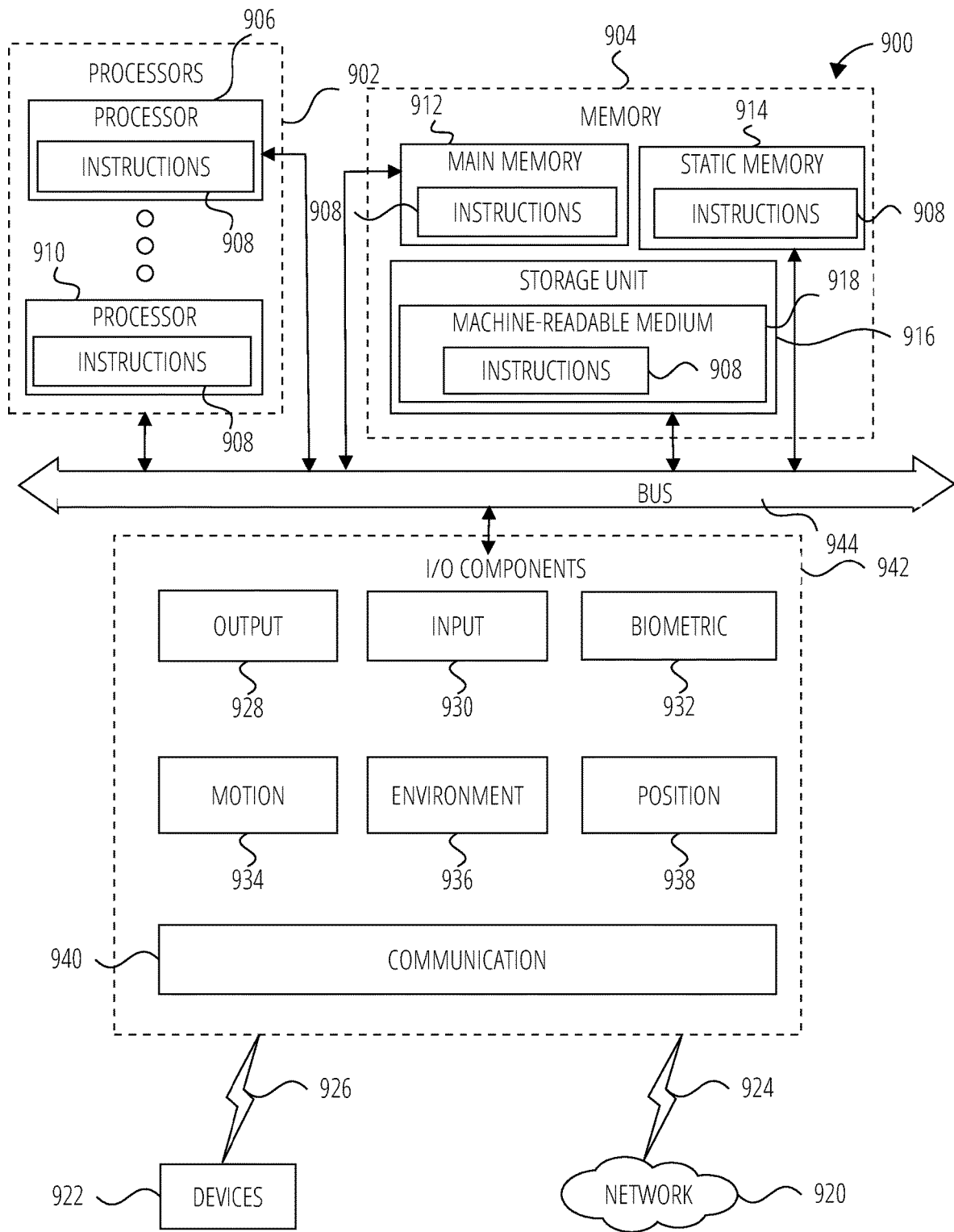
FIG. 9 is a diagrammatic representation of a machine in the form of a computer system within which a set of instructions may be executed for causing the machine to perform any one or more of the methodologies discussed herein, according to one example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include Processors 902, memory 904, and I/O Components 942, which may be configured to communicate with each other via a bus 944. In an example embodiment, the Processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 906 and a Processor 910 that execute the instructions 908. The term "Processor" is intended to include multi-core Processors that may comprise two or more independent Processors (sometimes referred to as "cores") that may execute instructions contemporaneously. Although FIG. 9 shows multiple Processors 902, the machine 900 may include a single Processor with a single core, a single Processor with multiple cores (e.g., a multi-core Processor), multiple Processors with a single core, multiple Processors with multiples cores, or any combination thereof.

The memory 904 includes a main memory 912, a static memory 914, and a storage unit 916, both accessible to the Processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the Processors 902 (e.g., within the Processor's cache memory), or any suitable combination thereof, during execution thereof by the machine 900.

The I/O Components 942 may include a wide variety of Components to receive input, provide output, produce output, transmit information, exchange information, capture measurements, and so on. The specific I/O Components 942 that are included in a particular machine will depend on the type of machine. For example, portable machines such as mobile phones may include a touch input device or other such input mechanisms, while a headless server machine will likely not include such a touch input device. It will be appreciated that the I/O Components 942 may include many other Components that are not shown in FIG. 9. In various example embodiments, the I/O Components 942 may include output Components 928 and input Components 930. The output Components 928 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 930 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 942 may include biometric Components 932, motion Components 934, environmental Components 936, or position Components 938, among a wide array of other Components. For example, the biometric Components 932 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 934 include acceleration sensor Components (e.g., accelerometer), gravitation sensor Components, rotation sensor Components (e.g., gyroscope), and so forth. The environmental Components 936 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 938 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 942 further include communication Components 940 operable to couple the machine 900 to a network 920 or devices 922 via a coupling 924 and a coupling 926, respectively. For example, the communication Components 940 may include a network interface Component or another suitable device to interface with the network 920. In further examples, the communication Components 940 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 922 may be another machine or any of a wide variety of peripheral devices (e.g., a peripheral device coupled via a USB).

Moreover, the communication Components 940 may detect identifiers or include Components operable to detect identifiers. For example, the communication Components 940 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the Processors 902) and/or storage unit 916 may store one or more sets of instructions and data structures (e.g., software) embodying or used by any one or more of the methodologies or functions described herein. These instructions (e.g., the instructions 908), when executed by Processors 902, cause various operations to implement the disclosed embodiments.

The instructions 908 may be transmitted or received over the network 920, using a transmission medium, via a network interface device (e.g., a network interface Component included in the communication Components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

EXAMPLES

Described implementations of the subject matter can include one or more features, alone or in combination as illustrated below by way of example.

Example 1 is a method comprising: identifying a gait pattern of a first user operating a first visual tracking system in a first physical environment; identifying a trajectory from a second visual tracking system operated by a second user in a second physical environment, the trajectory based on poses of the second visual tracking system over time; modifying the trajectory from the second visual tracking system based on the gait pattern of the first user; applying the modified trajectory in a plurality of virtual environments; and generating simulated ground truth data based on the modified trajectory in the plurality of virtual environments.

Example 2 includes example 1, further comprising: retraining a computer vision algorithm with the simulated ground truth data, the retrained computer vision algorithm configured for a motion pattern of the first user.

Example 3 includes example 2, further comprising: providing the retrained computer vision algorithm to the first visual tracking system, wherein the first visual tracking system is re-configured for the motion pattern of the first user based on the retrained computer vision algorithm.

Example 4 includes example 1, further comprising: retraining a computer vision algorithm with the simulated ground truth data, the retrained computer vision algorithm configured for one of the plurality of virtual environments.

Example 5 includes example 4, further comprising: providing the retrained computer vision algorithm to the first visual tracking system, wherein the first visual tracking system is located in a third physical environment, the third physical environment corresponding to the one of the plurality of virtual environments.

Example 6 includes example 1, wherein the ground truth data comprises a combination of color images, depth images, surface normals, and camera poses.

Example 7 includes example 1, further comprising: accessing sensor data from the first visual tracking system of the first user in the first physical environment; and determining the gait pattern of the first user based on the sensor data of the first user in the first environment.

Example 8 includes example 7, wherein the sensor data comprises 6DOF poses of the first visual tracking system over time in the first physical environment.

Example 9 includes example 1, further comprising: accessing sensor data from the second visual tracking system of the second user in the second physical environment; and determining the trajectory based on the sensor data from the second visual tracking system.

Example 10 includes example 1, further comprising: accessing sensor data from a first visual tracking system of a first user in a first environment; accessing pose data from a second visual tracking system of a second user in a second environment; determining a gait pattern of the first user based on the pose data of the first user in the first environment; modify a trajectory of the second virtual tracking system to adapt to the gait pattern of the first user; apply the modified trajectory in a plurality of virtual environments; accessing pose data from a second visual tracking system of a second user in a second environment; and generating a simulation of the first user trajectory in the second environment based on the first gait pattern of the first user in the first environment and the pose data of the second user in the second environment.

Example 11 is a computing apparatus comprising: a processor; and a memory storing instructions that, when executed by the processor, configure the apparatus to: identify a gait pattern of a first user operating a first visual tracking system in a first physical environment; identify a trajectory from a second visual tracking system operated by a second user in a second physical environment, the trajectory based on poses of the second visual tracking system over time; modify the trajectory from the second visual tracking system based on the gait pattern of the first user; apply the modified trajectory in a plurality of virtual environments; and generate simulated ground truth data based on the modified trajectory in the plurality of virtual environments.

Example 12 includes the computing apparatus of example 11, wherein the instructions further configure the apparatus to: retrain a computer vision algorithm with the simulated ground truth data, the retrained computer vision algorithm configured for a motion pattern of the first user.

Example 13 includes the computing apparatus of example 12, wherein the instructions further configure the apparatus to: provide the retrained computer vision algorithm to the first visual tracking system, wherein the first visual tracking system is re-configured for the motion pattern of the first user based on the retrained computer vision algorithm.

Example 14 includes the computing apparatus of example 11, wherein the instructions further configure the apparatus to: retrain a computer vision algorithm with the simulated ground truth data, the retrained computer vision algorithm configured for one of the plurality of virtual environments.

Example 15 includes the computing apparatus of example 14, wherein the instructions further configure the apparatus to: provide the retrained computer vision algorithm to the first visual tracking system, wherein the first visual tracking system is located in a third physical environment, the third physical environment corresponding to the one of the plurality of virtual environments.

Example 16 includes the computing apparatus of example 11, wherein the ground truth data comprises a combination of color images, depth images, surface normals, and camera poses.

Example 17 includes the computing apparatus of example 11, wherein the instructions further configure the apparatus to: access sensor data from the first visual tracking system of the first user in the first physical environment; and determine the gait pattern of the first user based on the sensor data of the first user in the first environment.

Example 18 includes the computing apparatus of example 17, wherein the sensor data comprises 6DOF poses of the first visual tracking system over time in the first physical environment.

Example 19 includes the computing apparatus of example 11, wherein the instructions further configure the apparatus to: access sensor data from the second visual tracking system of the second user in the second physical environment; and determine the trajectory based on the sensor data from the second visual tracking system.

Example 20 is a non-transitory computer-readable storage medium, the computer-readable storage medium including instructions that when executed by a computer, cause the computer to: identify a gait pattern of a first user operating a first visual tracking system in a first physical environment; identify a trajectory from a second visual tracking system operated by a second user in a second physical environment, the trajectory based on poses of the second visual tracking system over time; modify the trajectory from the second visual tracking system based on the gait pattern of the first user; apply the modified trajectory in a plurality of virtual environments; and generate simulated ground truth data based on the modified trajectory in the plurality of virtual environments.

What is claimed is:

1. A method comprising:
   identifying a gait pattern of a first user operating a first visual tracking system in a first physical environment;
   identifying a trajectory from a second visual tracking system operated by a second user in a second physical environment, the trajectory based on poses of the second visual tracking system over time;
   modifying the trajectory from the second visual tracking system based on the gait pattern of the first user;
   applying the modified trajectory in a plurality of virtual environments; and
   generating simulated ground truth data based on the modified trajectory in the plurality of virtual environments.

2. The method of claim 1, further comprising:
   retraining a computer vision algorithm with the simulated ground truth data, the retrained computer vision algorithm configured for a motion pattern of the first user.

3. The method of claim 2, further comprising:
   providing the retrained computer vision algorithm to the first visual tracking system, wherein the first visual tracking system is re-configured for the motion pattern of the first user based on the retrained computer vision algorithm.

4. The method of claim 1, further comprising:
   retraining a computer vision algorithm with the simulated ground truth data, the retrained computer vision algorithm configured for one of the plurality of virtual environments.

5. The method of claim 4, further comprising:
   providing the retrained computer vision algorithm to the first visual tracking system, wherein the first visual tracking system is located in a third physical environment, the third physical environment corresponding to the one of the plurality of virtual environments.

6. The method of claim 1, wherein the ground truth data comprises a combination of color images, depth images, surface normals, and camera poses.

7. The method of claim 1, further comprising:
   accessing sensor data from the first visual tracking system of the first user in the first physical environment; and
   determining the gait pattern of the first user based on the sensor data of the first user in the first environment.

8. The method of claim 7, wherein the sensor data comprises 6DOF poses of the first visual tracking system over time in the first physical environment.

9. The method of claim 1, further comprising:
   accessing sensor data from the second visual tracking system of the second user in the second physical environment; and
   determining the trajectory based on the sensor data from the second visual tracking system.

10. The method of claim 1, further comprising:
    accessing sensor data from a first visual tracking system of a first user in a first environment;
    accessing pose data from a second visual tracking system of a second user in a second environment;
    determining a gait pattern of the first user based on the pose data of the first user in the first environment;
    modify a trajectory of the second virtual tracking system to adapt to the gait pattern of the first user;
    apply the modified trajectory in a plurality of virtual environments;
    accessing pose data from a second visual tracking system of a second user in a second environment; and
    generating a simulation of the first user trajectory in the second environment based on the first gait pattern of the first user in the first environment and the pose data of the second user in the second environment.

11. A computing apparatus comprising:
    a processor; and
    a memory storing instructions that, when executed by the processor, configure the apparatus to:
      identify a gait pattern of a first user operating a first visual tracking system in a first physical environment;
      identify a trajectory from a second visual tracking system operated by a second user in a second physical environment, the trajectory based on poses of the second visual tracking system over time;
      modify the trajectory from the second visual tracking system based on the gait pattern of the first user;
      apply the modified trajectory in a plurality of virtual environments; and
      generate simulated ground truth data based on the modified trajectory in the plurality of virtual environments.

12. The computing apparatus of claim 11, wherein the instructions further configure the apparatus to:

retrain a computer vision algorithm with the simulated ground truth data, the retrained computer vision algorithm configured for a motion pattern of the first user.

13. The computing apparatus of claim 12, wherein the instructions further configure the apparatus to:

provide the retrained computer vision algorithm to the first visual tracking system, wherein the first visual tracking system is re-configured for the motion pattern of the first user based on the retrained computer vision algorithm.

14. The computing apparatus of claim 11, wherein the instructions further configure the apparatus to:

retrain a computer vision algorithm with the simulated ground truth data, the retrained computer vision algorithm configured for one of the plurality of virtual environments.

15. The computing apparatus of claim 14, wherein the instructions further configure the apparatus to:

provide the retrained computer vision algorithm to the first visual tracking system, wherein the first visual tracking system is located in a third physical environment, the third physical environment corresponding to the one of the plurality of virtual environments.

16. The computing apparatus of claim 11, wherein the ground truth data comprises a combination of color images, depth images, surface normals, and camera poses.

17. The computing apparatus of claim 11, wherein the instructions further configure the apparatus to:

access sensor data from the first visual tracking system of the first user in the first physical environment; and determine the gait pattern of the first user based on the sensor data of the first user in the first environment.

18. The computing apparatus of claim 17, wherein the sensor data comprises 6DOF poses of the first visual tracking system over time in the first physical environment.

19. The computing apparatus of claim 11, wherein the instructions further configure the apparatus to:

access sensor data from the second visual tracking system of the second user in the second physical environment; and determine the trajectory based on the sensor data from the second visual tracking system.

20. A non-transitory computer-readable storage medium, the computer-readable storage medium including instructions that when executed by a computer, cause the computer to:

identify a gait pattern of a first user operating a first visual tracking system in a first physical environment;

identify a trajectory from a second visual tracking system operated by a second user in a second physical environment, the trajectory based on poses of the second visual tracking system over time;

modify the trajectory from the second visual tracking system based on the gait pattern of the first user;

apply the modified trajectory in a plurality of virtual environments; and generate simulated ground truth data based on the modified trajectory in the plurality of virtual environments.

* * * * *